United States Patent Office 3,221,057
Patented Nov. 30, 1965

3,221,057
PHOSPHORUS POLYMERS
Irving Gordon, Niagara Falls, and James H. Brown, Lewiston, N.Y., assignors to Hooker Chemical Corporation, Niagara Falls, N.Y., a corporation of New York
No Drawing. Filed Nov. 21, 1960, Ser. No. 70,379
12 Claims. (Cl. 260—606.5)

This invention relates to the preparation of organic phosphorus polymers.

Numerous processes have been developed in which organic phosphorus compounds containing phosphorus linked to a methylol are polymerized with nitrogen compounds such as ammonia, amines, and the like. Cellulosic materials such as cellulosic textiles are impregnated with such polymers to impart flame-proofing properties to the material being treated. When an organic phosphorus halide compound such as tetrakis(hydroxymethyl) phosphonium chloride is used as a reactant in the formation of these polymers, a halogen acid such as hydrochloric acid is formed as a by-product of the polymerization reaction. Acids such as these weaken or tenderize the cloth or other cellulosic material being treated. As a result, it is necessary to employ a hydrogen chloride acceptor, such as ammonium hydroxide, amines, and the like, to combine with the hydrogen chloride during the polymerization. This technique is undesirable because the use of an acid acceptor adds significantly to the cost of preparing the polymer, and because undesirable acidic impurities are retained in the polymer under certain reaction conditions.

It is an object of this invention to provide a process for preparing polymers of organic phosphorus compounds.

Another object of this invention is to provide novel organic phosphorus polymer compositions.

Still a further object of the invention is to provide an improved method for treating cellulosic materials with organic phosphorus polymers.

These and other objects of the invention will be apparent from the following detailed description thereof.

It has now been discovered that when a tetrakis(α-hydroxyorgano)phosphonium compound of the formula

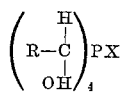

where R and X are as defined below, is heated to a temperature between about one hundred and fifty and about two hundred degrees centigrade, while passing a suitable gas through the resulting liquid, a linear polyether polymer is formed having flame retarding properties.

Organic phosphorus compounds capable of being polymerized in accordance with the instant invention include tetrakis(α-hydroxyorgano)phosphonium halides compound having the formula

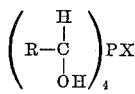

where R is hydrogen, alkyls having between about one and about six carbon atoms, alkenyls having between about one and about six carbon atoms, aryls having between about five and about ten carbon atoms and cycloalkyls having between about three and about six carbon atoms, and where X is a halogen such as chlorine, bromine, fluorine or iodine. In this formula, X may also be an oragnic anion, such as formate, acetate, benzoate, and the like. Typical examples of suitable tetrakis(α-hydroxyorgano)phosphonium chloride compounds are tetrakis(hydroxymethyl)phosphonium chloride, tetrakis(hydroxymethyl)phosphonium bromide, tetrakis(α-hydroxyethyl)phosphonium chloride, tetrakis(α-hydroxypropyl) phosphonium chloride, tetrakis(α-hydroxylallyl)phosphonium chloride, tetrakis(α-hydroxybenzyl)phosphonium chloride, tetrakis(α-hydroxymethylcyclohexyl)phosphonium chloride, and mixtures thereof. Tertiary phosphine oxide compounds having the formula:

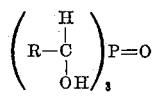

where R is as described above, may also be polymerized in accordance with the technique of the instant invention. Typical examples of suitable tertiary phosphine oxides include tris(hydroxymethyl)phosphine oxide, tris(α-hydroxyallyl)phosphine oxide, tris(α-hydroxybenzyl)phosphine oxide and mixtures thereof. Primary, secondary, and tertiary phosphines of the formula:

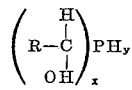

where R is as described above, x is 1 to 3, y is 0 to 2, and x+y=3, may also be polymerized in accordance with the technique of the instant invention. Typical examples of suitable phosphines include tris(hydroxymethyl) phosphine, tris(α-hydroxyethyl)phosphine, tris(α-hydroxypropyl)phosphine, tris(α-hydroxyallyl)phosphine, tris(α-hydroxybenzyl)phosphine, and the corresponding primary and secondary phosphines. While the instant invention can be applied to any of the above mentioned organic phosphorus compounds, the invention will be defined as applied to the above mentioned tetrakis(α-hydroxyorgano)phosphonium halide compounds for purposes of clarity.

In the process of the instant invention the tetrakis(α-hydroxyorgano)phosphonium halide compound is placed in a suitable container provided with heating means, agitation means, and means for bubbling an inert gas through the phosphonium halide compound during the polymerization reaction. By-products of the polymerization reaction include a hydrogen halide gas, an aldehyde, and water vapor, these gaseous products being carried off from the product by the inert gas being bubbled through the reaction mass. After completion of the reaction a linear polyether polymer is formed as the liquid residue. The polymerization reaction is believed to be represented by the following formula:

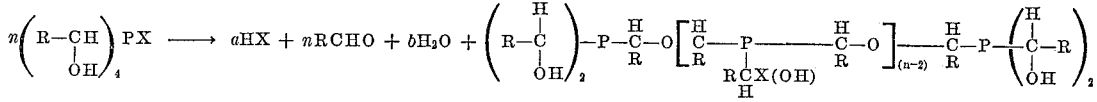 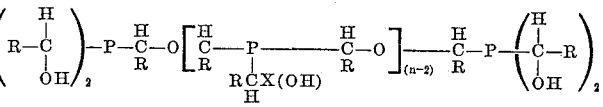

The tetrakis(α-hydroxyorgano)phosphonium halide compound may be added to the reaction vessel as a solid and then subsequently melted by heating, or it may be added to the reaction vessel as an aqueous solution. It is preferred to employ an aqueous solution containing between about fifty and about ninety percent by weight of the phosphonium halide compound, but more concentrated or more dilute solutions may be employed if desired. However, when the concentration of phosphonium halide compound is less than about fifty percent by weight, an excessive amount of water must be removed during the polymerization reaction.

Polymerization of the phosphonium halide compound is effected by heating the phosphonium halide compound to a temperature between about one hundred and fifty and about two hundred degrees centigrade, until polymerization is substantially complete. When the volume of the by-product gases of the hydrogen halide, the aldehyde, and water reaches a negligible level in the gas stream coming off of the reaction vessel, polymerization is generally substantially complete. The concentration of these by-product gases in the off gas stream can readily be determined by conventional techniques. For example, the volume of hydrogen chloride in the gas is readily indicated as being at a low level when a moist litmus paper placed in the gas stream is no longer pink. The aldehyde concentration in the off gas is readily determined by the Fuchsin aldehyde test. Generally substantially complete polymerization is effected after between about four and about eight hours of reaction, but any polymerization reaction period which is consistent with commercial operation may be employed.

Gases suitable for passing through the reaction mass during the polymerization reaction include those gases which are inert under the reaction conditions employed, such as air, hydrogen, nitrogen, carbon dioxide, and mixtures thereof.

It will be recognized by those skilled in the art that any rate of gas passing through the reaction mass capable of carrying off the gaseous by-products may be employed. Generally, a gas rate sufficient to maintain a gas volume of between about 0.5 to about ten percent of the liquid volume in volumes per minute will give satisfactory results.

The novel liquid polymers produced in accordance with the instant technique may be used as a substitute for phosphonium halide compounds such as tetrakis(hydroxymethyl)phosphonium chloride in the preparation of nitrogen-phosphorus containing polymers suitable for applying to cellulosic materials such as cellulosic textiles. These techniques are well known in the art. If desired, the novel polymer of the instant invention may be applied directly to cellulosic materials such as paper, and textiles, and then cured to yield a flame retarding coating on the material being treated.

The following examples are presented to define the invention more fully without any intention of being limited thereby.

*Example 1*

The apparatus used in this example was comprised of a five-liter resin flask, heating mantle, agitator, thermometer, and a gas inlet tube. The resin flask was charged with two thousand, three hundred and five grams of tetrakis(hydroxymethyl)phosphonium chloride. This solid was heated to the melting point (about one hundred and twenty degrees centigrade), and at this point air was bubbled through the melt at about sixty milliliters per minute. The temperature of the melt was now increased to one hundred and sixty degrees centigrade, and maintained at the one hundred and sixty-one hundred and eighty degree centigrade range for five and one-half hours. During this time formaldehyde, water and hydrogen chloride was evolved from the reaction mixture. This polymerization reaction proceeded without an exotherm, and near the end of the reaction the evolution of water, formaldehyde and hydrogen chloride was almost negligible. 1,405 grams of polymer were obtained. This polymer of tetrakis(hydroxymethyl)phosphonium chloride was a viscous yellow syrup at room temperature and contained 0.3 percent residual tetrakis(hydroxymethyl)phosphonium chloride monomer, 1.9 percent ionic chloride, 0.2 percent formaldehyde, 11.4 percent total chlorine, 28.13 percent carbon, 7.19 percent hydrogen, and 24.2 percent phosphorus. The viscosity of the liquid polymer was one hundred and twelve centistokes at one hundred and sixty degrees Fahrenheit, 529.3 centistokes at one hundred and eighty degrees Fahrenheit, and two hundred and eight centistokes at two hundred and ten degrees Fahrenheit, and the refractive index at twenty-five degrees centigrade was 1.5216.

*Example 2*

The apparatus of Example 1 was used in this example, and a similar procedure was employed, with the exception that carbon dioxide was used as the gas instead of air. Tetrakis(hydroxymethyl)phosphonium chloride (three thousand three hundred and sixty-five grams) was melted in the flask, and carbon dioxide was then passed through the melt at about sixty milliliters per minute. The melt was heated to a temperature of between one hundred and fifty and one hundred and seventy-five degrees centigrade. A large volume of a gaseous mixture of hydrogen chloride, formaldehyde, carbon dioxide and water was given off as the polymerization progressed, the volume of the gaseous mixture gradually decreasing to a negligible amount as the polymerization reaction neared completion. The product was collected after six and one-half hours of heating under these conditions. The product (two thousand two hundred and eighty-six grams) was a viscous straw colored liquid polymer containing 1.74 percent unpolymerized tetrakis(hydroxymethyl)phosphonium chloride, 1.1 percent formaldehyde, and 12.1 percent total chloride, 2.9 percent ionic chloride, and 23.3 percent phosphorus. The refractive index of the product was 1.5198 at twenty-five degrees centigrade. The viscosity of the polymer was 665.3 centistokes at one hundred and sixty degrees centigrade, three hundred an thirty-eight centistokes at one hundred and eighty degrees centigrade and 142.5 centistokes at two hundred and ten degrees centigrade.

*Example 3*

Tetrakis(hydroxymethyl)phosphonium chloride was polymerized in a manner similar to Example 1, employing nitrogen instead of air as the gas. The reaction was carried out at a temperature of about one hundred and seventy-five degrees centigrade for about six hours. The polymer product contained 0.43 percent tetrakis(hydroxymethyl)phosphonium chloride, 0.2 percent formaldehyde, 11.6 percent total chlorine, 1.6 percent ionic chlorine, 28.43 percent carbon, 7.02 percent hydrogen and 24.6 percent phosphorus.

*Example 4*

The procedure similar to that of Example 1 was used, employing hydrogen instead of air as the gas. A product similar to the polymer of Example 1 was produced.

Infrared analyses of the products of Examples 1–4 confirmed the qualitative identity of the polymers of tetrakis(hydroxymethyl)phosphonium chloride.

*Example 5*

A procedure similar to Example 1 was employed using tetrakis(hydroxymethyl)phosphonium bromide (one hundred grams), as the starting material. The material was melted, air was introduced to the melt at the rate of about thirty milliliters per minute. The material was heated at a temperature of about one hundred and seventy-five degrees centigrade for about five hours. Sixty grams of polymer was produced in this period. The polymer contained 0.5 percent tetrakis(hydroxymethyl/phosphonium bromide, 38.4 percent total bromine, 3.0 percent ionic bromine, and 0.1 percent formaldehyde.

*Example 6*

The following ingredients were mixed in the given proportions and then diluted with water to a fifty percent solution.

| | Percent |
|---|---|
| Tetrakis(hydroxymethyl)phosphonium chloride (prepared as Example 4) | 27.7 |
| Triethanolamine | 1.4 |
| Urea | 3.5 |
| Trimethylol melamine | 67.4 |

The above solution was then diluted with a fifty percent vinyl chloride-vinylidene chloride latex so that the latex composed ten to forty percent of the solution. This mixture was then diluted with water to a solid content of about twenty percent. Samples of a commercial carburetor air-filter paper were then padded with this mixture, dried for thirty minutes at eighty degrees centigrade, and cured for fifteen minutes at one hundred and fifty degrees centigrade. Duplicate sets of four 5″ x 5″ sheets were prepared for each formulation. The average weights of the sheets in each set were used to determine resin content; bursting strength and stiffness were determined on two sheets of a set. The percent latex given below was calculated on the basis of the weight of the other resin forming ingredients rather than on the total weight of the resin formulation.

| Sample No. | Formulation | Average resin content percent | Mullen burst lbs./in.$^2$ | Gurley Stiffness, mgs. |
|---|---|---|---|---|
| 1 | 10% latex | 31.0 | 13 | 2,800 |
| 2 | do | 30.0 | 12 | 2,700 |
| 3 | 40% latex | 30.0 | 17 | 2,000 |
| 4 | do | 36.5 | 17 | 4,000 |

Flame resistance was evaluated visually. All of the above samples gave satisfactory flame resistance compared with the untreated paper.

The tetrakis(hydroxymethyl)phosphonium chloride polymer treated paper appeared to be stiffer and to possess a higher tear strength than paper given the conventional tetrakis(hydroxymethyl)phosphonium chloride-trimethylolmelamine resin treatment.

It will be recognized by those skilled in the art that various modifications within the invention are possible, some of which have been referred to above. Therefore, we do not wish to be limited except as defined by the appended claims.

We claim:

1. A process for polymerizing a tetrakis(α-hydroxyorgano)phosphonium halide compound having the formula:

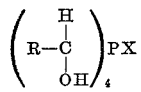

where R is selected from the group consisting of hydrogen, alkyls having between about one and about six carbon atoms, alkenyls having between one and about six carbon atoms, aryls having between about five and ten carbon atoms, and cycloalkyls having between about three and about six carbon atoms, and X is a halogen selected from the group consisting of chlorine, bromine, fluorine and iodine, which comprises heating said phosphonium halide compound to a temperature between about one hundred and fifty and about two hundred degrees centigrade until polymerization is substantially complete, while passing a gas inert to the reaction mass through the reaction mass until polymerization is substantially complete, the amount of said inert gas passed through said reaction mass being at least sufficient to carry off substantially all of the gaseous by-products of the reaction.

2. The process of claim 1 wherein said phosphonium halide compound is tetrakis(hydroxymethyl)phosphonium chloride.

3. The process of claim 1 wherein said phosphonium halide compound is tetrakis(hydroxymethyl)phosphonium bromide.

4. The process of claim 2 wherein said phosphonium halide compound is heated for a period between about four and about eight hours.

5. The process of claim 1 wherein said gas is air.

6. The process of claim 1 wherein said gas is nitrogen.

7. The process of claim 1 wherein said gas is carbon dioxide.

8. The process of claim 1 wherein said gas is hydrogen.

9. The liquid polymer produced by the process of claim 1.

10. The liquid polymer produced by the process of claim 1 wherein said phosphonium halide compound is a tetrakis(hydroxymethyl)phosphonium halide.

11. The liquid polymer produced by the process of claim 2.

12. The liquid polymer produced by the process of claim 3.

References Cited by the Examiner

UNITED STATES PATENTS 2,668,096  2/1954  Reeves et al. _____ 260—2
2,743,299  4/1956  Flynn et al. _____ 260—606.5

OTHER REFERENCES

Hoffman: Journal American Chemical Society, vol. 43, pages 1684–8 (1921).

Messinger et al.: Berichte, vol. 21, pages 326–336 (1888).

Reeves et al.: Journal American Chemical Society, vol. 77, pages 3923–4 (1955).

TOBIAS E. LEVOW, *Primary Examiner.*

HAROLD BURNSTEIN, *Examiner.*